US011584098B2

(12) United States Patent
Zitsch et al.

(10) Patent No.: US 11,584,098 B2
(45) Date of Patent: Feb. 21, 2023

(54) OVERMOLDED OPTICAL CIRCUITS

(71) Applicant: TE Connectivity Services GmbH, Schaffhausen (CH)

(72) Inventors: Dwight David Zitsch, Carlisle, PA (US); Megan Beers, Redwood City, CA (US); Henry Burton Piper, III, Middletown, PA (US); Aakriti Kharel, San Jose, CA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 239 days.

(21) Appl. No.: 16/776,175

(22) Filed: Jan. 29, 2020

(65) Prior Publication Data

US 2021/0229379 A1   Jul. 29, 2021

(51) Int. Cl.
*B29D 11/00* (2006.01)
*G02B 6/36* (2006.01)

(52) U.S. Cl.
CPC ...... *B29D 11/00663* (2013.01); *G02B 6/3612* (2013.01)

(58) Field of Classification Search
CPC ............ B29D 11/00663; G02B 6/3612
See application file for complete search history.

(56) References Cited

U.S. PATENT DOCUMENTS

| 5,266,245 A | 11/1993 | Wellings |
| 10,379,311 B1 | 8/2019 | Krywicki et al. |
| 2003/0012541 A1 | 1/2003 | Shimomichi et al. |
| 2003/0178748 A1* | 9/2003 | Bolken ............... H01L 24/48 |
| | | 264/272.17 |

FOREIGN PATENT DOCUMENTS

| JP | H08 278431 A | 10/1996 |
| NL | 275 475 A | 10/1964 |

OTHER PUBLICATIONS

European Search Report, dated Jun. 15, 2021, EP 21020038, European Application No. 21020038.2-1001.

* cited by examiner

*Primary Examiner* — Mathieu D Vargot (57) ABSTRACT

A method of preparing an overmolded optical fiber assembly comprising: (a) placing at least one flexible optical circuit in a bottom mold, said bottom mold defining a bottom overmold cavity having a bottom surface, said at least one flexible optical circuit having a substrate and a plurality of fibers adhered to said substrate, said substrate being disposed within said bottom overmold cavity to define a first space between said substrate and said bottom surface; (b) flowing a polymer in at least said first space; (c) placing a top mold over said substrate, said top mold defining a top overmold cavity and a top surface and a port defined in said top surface to access said top overmold cavity, said substrate defining a second space between said top surface and said substrate; (d) flowing a polymer in at least a portion of said second space; and (e) removing said bottom and top molds to release said overmolded optical circuit.

18 Claims, 7 Drawing Sheets

OVERMOLDED OPTICAL CIRCUITS

FIELD OF INVENTION

The present invention relates generally to a flexible optical circuit, and, more particularly, to an overmolded flexible optical circuit.

BACKGROUND

The recent surge in demand for bandwidth is creating new challenges for designers of next generation optical networks and systems. This increase in bandwidth leads to a multi-fold increase in optical transmissions, switching, and cross-connection, plus new multiplexing schemes, to transport, process and distribute information to end users efficiently. Thus, back-planes, cross-connects and distributions panels have become highly optical-connection-density intensive. This in turn results in a many-fold increase in the number of fiber optic jumpers and fan-out cables that are needed to interconnect the required optical connections in an orderly, manageable, predictable and cost-effective manner. This becomes a serious problem both in terms of space for dressing optical cables and cost for implementing and maintaining such systems. The situation is particular problematic in applications in which space and weight is at a premium, such as, for example, in aircraft applications. Therefore, new approaches must be developed to address optical fiber congestion problems.

One approach for managing optical fibers is a flexible optical circuit. Such circuits are well known. A conventional flexible optical circuit comprises a flexible substrate having an adhesive surface upon which optical fibers are routed and adhered such that the fibers are organized and held in place to maintain a minimum bend radius. A length of each fiber extends from the substrate. A conformal coating is typically applied over the substrate, and over the extending fibers to form ribbonized cables. Thus, a typical flexible optical circuit comprises a flexible substrate from which ribbon cables extend. Based upon the application, these ribbon cables are either terminated with a multi-fiber termini, or they are broken down into individual fibers in fiber break-outs and then terminated with single or multi-fiber termini. These are well-known configurations.

Although flexible optical circuits are versatile and compact, Applicant recognizes the need to ruggedize these circuits. Specifically, often these optical circuits are used in applications, such as instrument modules in aircraft, in which the instrument components are liquid cooled. The liquid used for cooling in these applications, tends to be caustic. In the event of a breach of the instrument components, the cooling liquid may be dispersed throughout the module, likely contacting the optical circuit. Furthermore, more recently, these modules need to be resistant to cleaning agents such as MEK, TCE, and Alkaline Cleaners.

Additionally, even in applications not involving caustic cooling or cleaning liquids, the optical circuits tend to be subject to high vibration, and thus, any contact with adjacent equipment or other circuits poses an abrasion risk.

Therefore, Applicant has identified a need for an optical circuit having both abrasion and chemical resistance.

One configuration offered by Applicant is an optical circuit overmolded with an abrasion/chemical resistant material such as a fluoropolymer. Applicant has successfully produced such overmolded optical circuits for use in instrument modules and other applications experiencing high vibration and/or potential caustic environments Applicant discovered that overmolding not only protects the optical circuit as described above, but also provides for complex configurations. More specifically, Applicant has produced optical circuits in which two or more relatively—simple optical circuits are combined and then overmolded to form a single relatively—complex assembly. Thus, by using relatively simple optical circuits as building blocks, complex arrangements can be produced and held in place through overmolding.

Although the overmolded optical circuit offered by Applicant provided the abrasion and chemical resistance desired, while also facilitating more complex fiber assemblies, Applicant nevertheless recognize significant shortcomings in the prior configuration. For example, from a manufacturability standpoint, these overmolded optical circuits were problematic as the fluoropolymer was highly viscous and had to be applied by hand and essentially buttered into the molds. Such a manufacturing technique was not only prohibitively expensive and essentially impossible to scale up, but also lack consistency in the final product. Specifically, because the fluoropolymer had to be buttered into the molds, often air pockets or inconsistent thicknesses resulted. Moreover, the optical circuit was often distorted/warped as the buttered molds were sandwiched around it because of the high viscosity of the fluoropolymer, often resulting in inadequate/inconsistent overmolding of certain areas of the optical circuit.

Although Applicant considered injection molding to enhance manufacturability and to avoid the aforementioned voids, the high viscosity of the fluoropolymer is too great and would distort/damage the optical circuit if it were injected into the molds. More specifically, in typical injection molding, the polymer is injected into the mold until it exits through vents in the mold. However, in the present case, the fluoropolymer would have to be injected under very high pressure due to its viscosity. This high pressure would likely distort and/or damage the optical circuit within the mold. Therefore, injection molding is not a practical solution.

Applicant also considered spraying on the overmolding material. However, this approach produced unacceptable variance in the thickness of the overmolding material.

Applicant also considered using fluoropolymer preforms. Specifically, sheets of fluoropolymer preforms would sandwich the optical circuit, and then the assembly would be subjected to heat and pressure to essentially melt the preforms together to form the overmolded optical circuit. However, this approach was deemed unacceptable as well because, as the complexity of the fiber assembly increases—i.e. as more than two optical circuits were combined—the overlap of the preforms made the fiber assembly prohibitively thick in certain areas.

Therefore, there is a need for an improved approach for producing overmolded optical circuits, which facilitates manufacturability, yet produces consistent results and is flexible to allow for the production of complex assemblies. The present invention fulfills these needs among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Applicant recognizes that an important aspect to producing a manufacturable overmolded optical circuit is maintaining the position of the optical circuit within the molds and avoiding distorting/warping the optical circuit during the introduction of the overmolding material. To this end, Applicant discloses alternate embodiments for positioning and avoiding the disturbance of the optical circuit during overmolding. For example, in one embodiment, a flowable overmolding material is used which is self-leveling and therefore is applied over the optical circuit, and therefore avoids the need to butter molds with the overmolding polymer and sandwich the molds around the optical circuit, which invariably distorts the optical circuit. In another embodiment, a portion of the overmolding polymer is allowed to precure to provide a more stable foundation upon which the optical circuit is supported prior to introducing the final layer of overmolding polymer. In yet another embodiment, various structures are used within the molds to position and hold the optical circuit in place. In another embodiment, combinations of different approaches such as precuring and structural supports are used to prepare the overmolded optical circuit. Still other embodiments will be obvious to those of skill in the art in light of this disclosure.

One aspect of the invention is a method of overmolding a flexible circuit. In one embodiment, the method of preparing an overmolded optical fiber assembly comprising: (a) placing at least one flexible optical circuit in a bottom mold, said bottom mold defining a bottom overmold cavity having a bottom surface, said at least one flexible optical circuit having a substrate and a plurality of fibers adhered to said substrate, said substrate being disposed within said bottom overmold cavity to define a first space between said substrate and said bottom surface; (b) flowing a polymer in at least said first space; (c) placing a top mold over said substrate, said top mold defining a top overmold cavity and a top surface and a port defined in said top surface to access said top overmold cavity, said substrate defining a second space between said top surface and said substrate; (d) flowing a polymer in at least a portion of said second space; and (e) removing said bottom and top molds to release said overmolded optical circuit.

Another aspect of the invention is an overmolded circuit made. In one embodiment, the overmolded circuit comprises the product made for the process comprising: (a) placing at least one flexible optical circuit in a bottom mold, said bottom mold defining a bottom overmold cavity having a bottom surface, said at least one flexible optical circuit having a substrate and a plurality of fibers adhered to said substrate, said substrate being disposed within said bottom overmold cavity to define a first space between said substrate and said bottom surface; (b) flowing a polymer in at least said first space; (c) placing a top mold over said substrate, said top mold defining a top overmold cavity and a top surface and a port defined in said top surface to access said top overmold cavity, said substrate defining a second space between said top surface and said substrate; (d) flowing a polymer in at least a portion of said second space; and (e) removing said bottom and top molds to release said overmolded optical circuit.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 8:
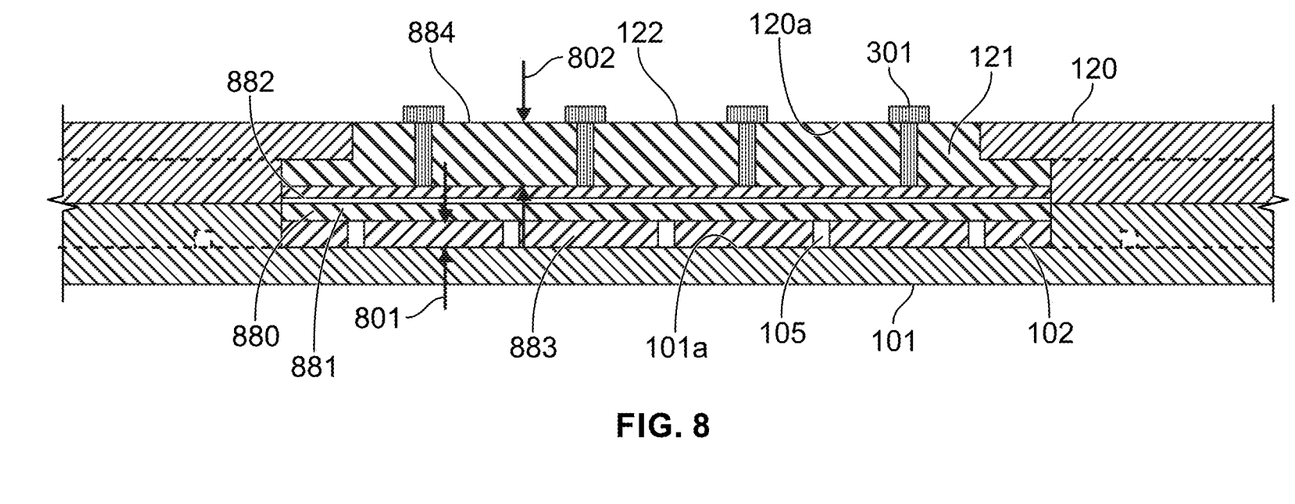
FIG. 8 shows a cross-sectional view of a portion of the molds shown in FIG. 4.

Referring to FIGS. 1a through 1f, one embodiment of a method of preparing the overmolded flexible assembly of the present invention is shown. Specifically, referring to FIG. 1a, the method comprises (a) placing at least one flexible optical circuit (not shown) in a bottom mold 101, the bottom mold defining a bottom overmold cavity 102 having a bottom surface 101a, the at least one flexible optical circuit having a substrate and a plurality of fibers adhered to the substrate, the substrate being disposed within the bottom overmold cavity to define a first space 801 (see FIG. 8) between the substrate and the bottom surface; (b) flowing a polymer in at least the first space; (c) placing a top mold 120 over the first mold 101, the top mold defining a top overmold cavity 121 and a top surface 120a and a port 122 defined in the top surface to access the top overmold cavity, the substrate defining a second space 802 (see FIG. 8) between the top surface and the substrate; (d) flowing a polymer in at least a portion of the second space; and (e) removing the first and top molds 101, 120 to release the overmolded optical circuit 150. In this particular embodiment, the overmolded optical circuit 150 comprises an overmolded portion 152 from which fiber portions 151 extend.

The method, system, and article of manufacture of the present invention are considered below in greater detail and with respect to selected, alternative embodiments.

It should be understood that the sequence of the steps above may be performed in any order. For example, the optical circuit may be disposed in the bottom mold prior to applying the polymer to the bottom mold, or it may be disposed in the mold after applying the polymer to the bottom mold. (For example, it may be preferable to apply the optical circuit after the application of the polymer to the first mold if some degree of precuring is desired to aid in the positioning of the optical circuit within the molds (discussed below). Alternatively, if standoffs are used (discussed below), then it may be preferable to apply the polymer after the optical circuit is disposed in the molds.) Likewise, the top mold may be coupled to the bottom mold before the introduction of polymer to either the bottom or top mold, or the top mold may be coupled to the bottom mold after the introduction of polymer to the bottom mold. (For example, it may be preferable to apply the polymer to the first and second molds after the top mold is coupled to the bottom if some kind of injection molding is used. Alternatively, it may be preferable to apply the polymer to the bottom mold before coupling the top mold to the bottom mold if some degree of precuring is desired as described below.)

An important feature of the method and system of the present invention is the configuration of the molds. The molds function not only to contain the overmolding material in its fluid state, but also to position the optical circuit precisely within the mold such that a minimum layer of mold material is maintained on either side of the substrate of the optical circuit. Throughout this description, a two mold configuration—i.e. a top and bottom mold—is disclosed. It should be understood, however, that other embodiments are possible. For example, it may be preferred in certain applications to use an intermediate mold to control the position of the flexible optical circuit and/or level the level of overmolding material on either side of the substrate. Still other embodiments will be obvious to those of skill in the art in light of this disclosure.

Figure 1A:
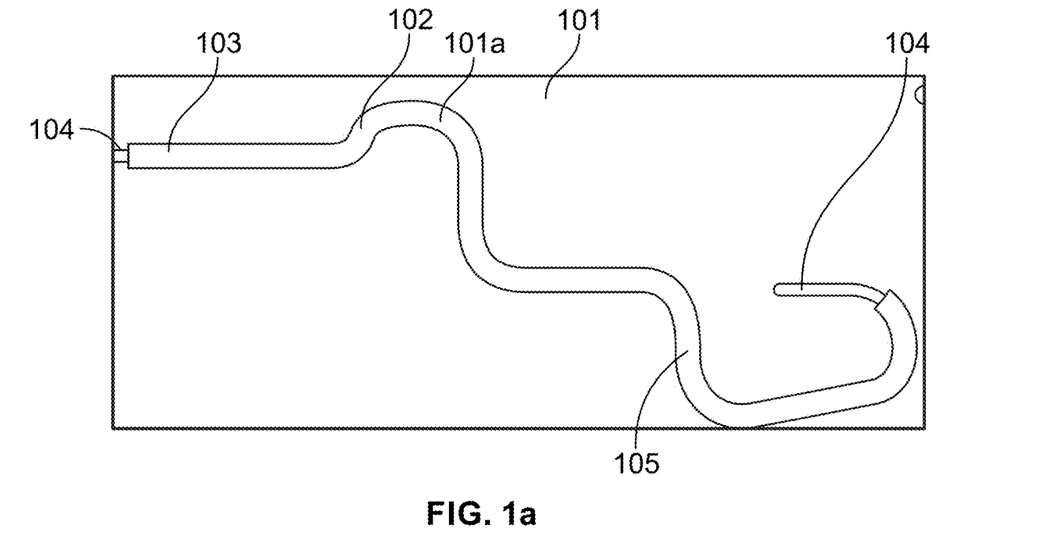
FIGS. 1a-1f show one embodiment of the steps of preparing the overmolded optical circuit of the present invention.
Figure 1B:
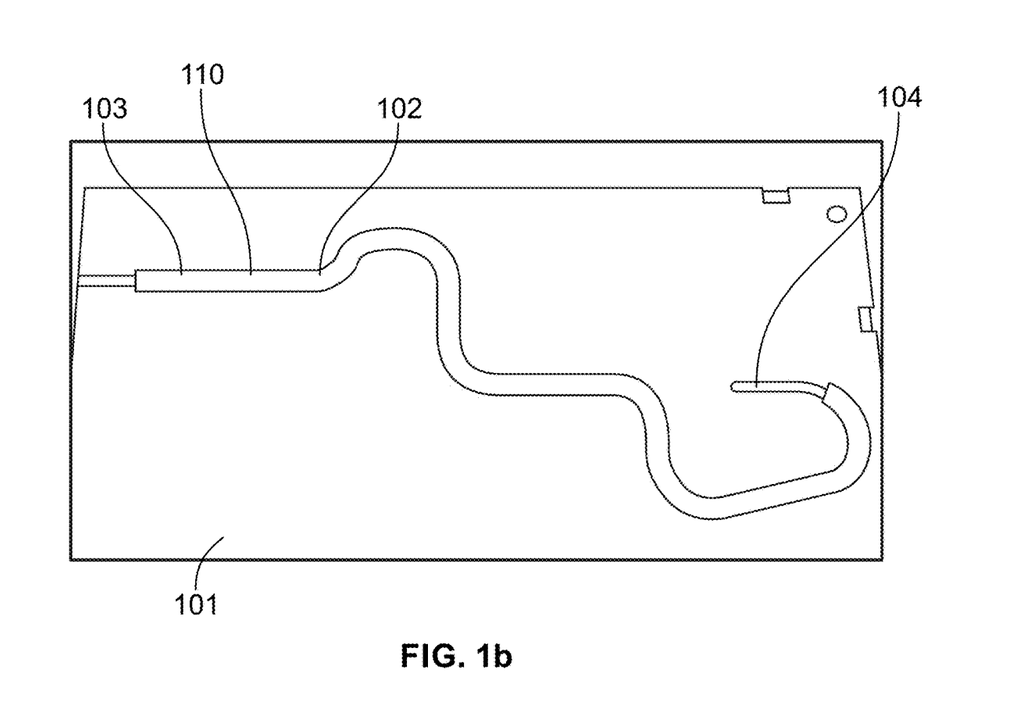
Figure 1C:
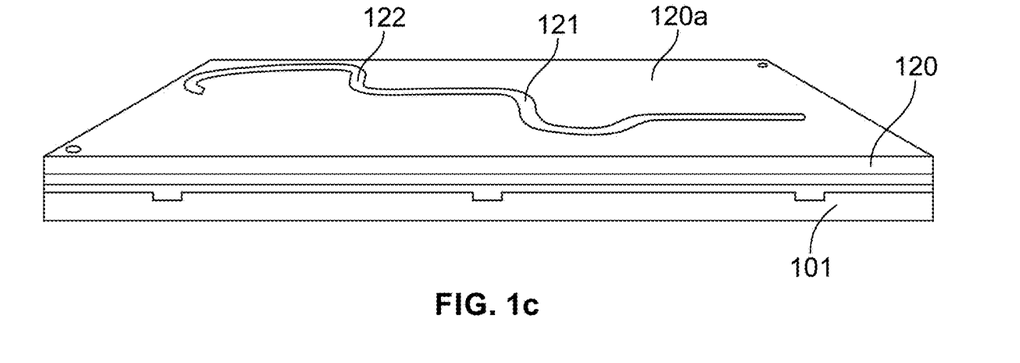
Figure 1D:
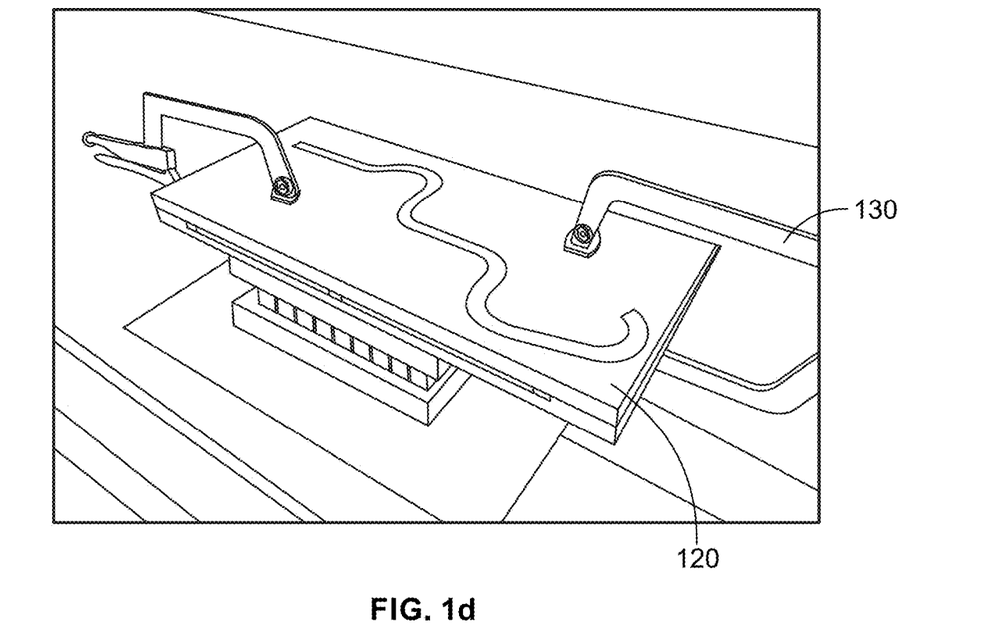
Figure 1E:
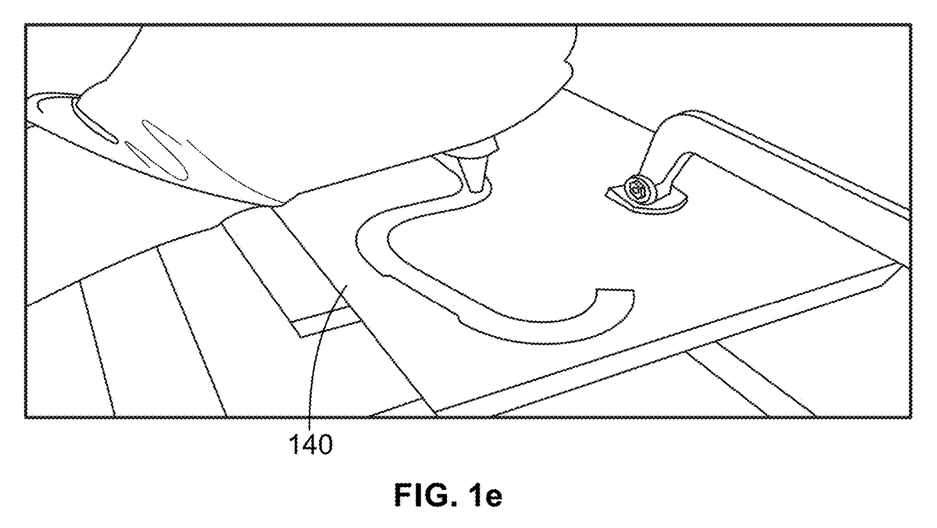
Figure 1F:
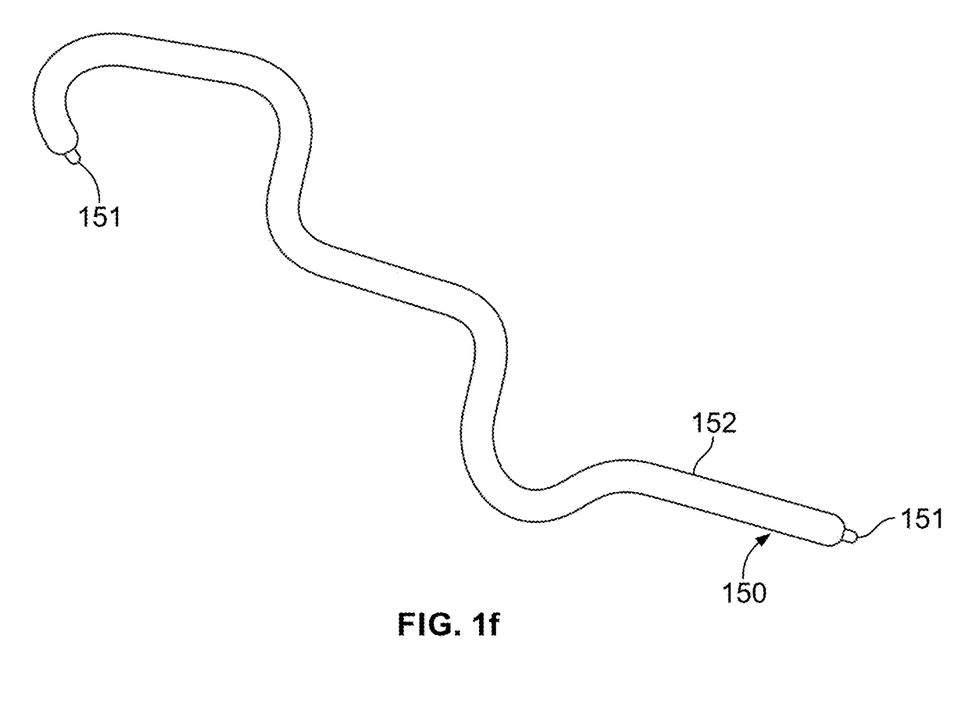

Each mold defines an overmolded cavity. Specifically, as shown in FIGS. 1a and 1c, the bottom mold 101 defines a bottom overmolded cavity 102, and the top mold 120 defines a top overmolded cavity 121. The overmolded cavity is configured to contain the overmolding material. Generally, although not necessarily, the top and bottom overmolded cavities will be configured such that they align with each other when the top mold is placed on top of the bottom mold. Additionally, often, but not necessarily, the cavities will be similarly sized in the top and bottom molds. In other words, the amount of overmolded material on the bottom side of the optical circuit will be typically about the same as the amount of material on the top side of the optical circuit. It should be understood, however, that that the amount of overmolding material on either side of the substrate can be varied according to the application.

In one embodiment, the top and/or bottom mold may comprise fiber cavities 104 which function to hold the fibers in place during the overmolded overmolding process and prevent the ingress of overmolding material. In other words, as is known, most optical circuits and have free fibers which are not adhered to the substrate, but extend from the substrate for termination or other optical connection. These fibers generally, although not necessarily, should remain free and unencumbered by overmolding material. Thus, the molds are configured to prevent the overmolding material from flowing around these fibers. Although fiber cavities 104 shown in FIG. 1a, other embodiments exist for preventing overmolding of the free fibers. For example, in one embodiment, rather than protecting the fibers in fiber cavities 104 as shown, the fibers are simply ported out of the molds. Still other embodiments will be obvious to those skilled in the art in light of this disclosure.

An important feature of the molds of the present invention is the advent of a port 122 to access the top overmolded cavity. This port allows the top mold to be positioned over the bottom mold with the optical circuit sandwiched in between prior to introducing the molding material into the top mold. In other words, rather than filling the top mold with the molding material and then applying it to the optical circuit as was done previously, the top mold is secured prior to the introduction of the molding material. This allows the optical circuit to be positioned precisely. The configuration of the port may vary. Although the port is disclosed herein as being essentially over the entire top overmolded cavity, other embodiments exist. For example, in one embodiment, rather than just one large port, one or more smaller ports may be used, in which each port is over just a portion of top overmolded cavity. Such embodiment may be preferred if the polymer used is particularly flowable and does not need to be delivered along the entirety of the overmolded cavity. Such an embodiment may also be preferred as a way of providing standoffs that are integral to the top mold (discussed below). That is, if the top overmolded cavity is not open everywhere to the port then standoffs may be integrated on those portions of the top mold that cover the overmolded cavity. Additionally, a configuration having limited ports may be preferred for injection molding as is known in the art.

The material or materials used for overmolding may vary according to the application. In one embodiment, the overmolding material is configured to flow within the overmolded cavity. As used herein, the term flow or flowability means that the material is self-leveling. Those of skill in the art can determine flowable materials in light of this exposure. Generally, although not necessarily, the material has a viscosity less than 80 Pa-s, and, in one embodiment, has a viscosity less than 70 Pa-s, and, in one embodiment has a viscosity less than 50 Pa-s, and, in one embodiment, has a viscosity less than 40 Pa-s, and, in one embodiment, has a viscosity less than 20 Pa-s.

The molding material should also be chosen based upon its desired protective characteristics. For example, if the application requires chemical resistance, then the material should be a curable, polymer having a high chemical resistance. Such polymers are well known, and include, for example, fluoropolymers and epoxies. Specifically, the fluoropolymer can be a one part fluoropolymer or a two-part fluoropolymer depending upon the desired characteristics. Suitable fluoropolymers include fluorosilicone such as F-LSR (Dow Corning FL-30-9201) and/or fluoroelastomer. Below is a selection of suitable fluoropolymers for use in the present invention. It should be understood however that other materials may be used.

| Material Name | Type | Viscosity (Pa-s) | Shore A Hardness | Tensile Strength (MPa) |
|---|---|---|---|---|
| CF1-3510 | 2-part Fluorosilicone | 70 | 20 | 1.45 |
| FE-61 | 1-part Fluorosilicone | 60 | 25 | 0.6 |
| SIFEL 2614 | 1-part Fluoroelastomer | 20 | 25 | 1.1 |
| SIFEL 3405 | 2-part Fluoroelastomer | 75 | 40 | 8.0 |
| SIFEL 3590-N | 1-part Fluoroelastomer | 50 | 55 | 7.8 |

In applications in which only abrasion resistance is required, then other polymers such as silicones, epoxies, EPDM, PTFE, nitrile rubber, thermoplastic elastomer, and polyurethanes may be used. In such applications, these materials may be curable and may be dispensed in a pre-cured state, or, alternatively, they may be heated or mixed with solvent in order to dispense them if they are not curable.

Applying the overmolding material can be performed in different ways. In one embodiment, the overmolding material is applied separately into the bottom mold and then into the top mold. That is, the overmolding material is flowed into the bottom mold either before or after the substrate is placed in the bottom mold, and then, in a separate step the overmolding material is flowed through the port in the top mold after the top mold is clamped onto the bottom mold. It should be understood, however, that other embodiments are possible. For example, rather than applying the overmolding material into each mold separately, the molds are clamped together and then the overmolding material is applied in one step through the access port. In such an embodiment, it is important to have fluid communication between the top and bottom overmolded cavities. Rather than clamping the molds together, they may be held together with fasteners such as screws, and/or a gasket may be used between two parts of mold. In yet another embodiment, a hot press is used to apply pressure to hold two parts together while curing the material. In still another embodiment, the molds are coated with a rubbery material.

Furthermore, how the overmolding material is introduced into the molds can vary. In one embodiment, the overmolding material is disposed along the overmolded cavity essentially along the entire length of the overmolded cavity. Such an application has the benefit of minimizing the degree to which the material must flow to fill adequately the overmolded cavity. In one particular embodiment, the overmolding material is disposed in the overmolded cavity from the outside in to minimize voids and air gaps. Specifically, Applicant has found that applying the material lengthwise along the perimeter of the overmolded cavity and then moving inwardly toward the center of the cavity provides for suitable results. In another embodiment, a dispensing tip is used that is not a single small point, but rather a "fan-out" tip with a rectangular opening roughly the width of the cavity so that the material may be dispensed in one pass without introducing voids/air gaps.

It should be understood, however, that other approaches for introducing the overmolding material exists. For example, in one embodiment, a lower viscosity overmolding material may be injected into the molds. As discussed above, injection molding involves injecting the polymer in one or more locations and allowed it to vent through one or more events. Still other techniques for applying the overmolding material will be known to those of skill in the art in light of this disclosure.

Depending upon the polymer used, it may be necessary or preferable to facilitate curing of the polymer. Such techniques are well known in the art and will not be described here in detail. Suffice it to say that one approach may be to heat the molds to assist in polymerization. For example, suitable results have been obtained by heating the molds at 50° C. for 16.5 hr, and then post cure at 200° C. for 4 hr.

As mentioned above, it is important that the overmolding material cover the optical circuit in a consistent manner. In other words, the overmolding material should not be too thick so as to waste space or add unnecessary weight, nor should it be too thin so as to leave the optical circuit unprotected. Generally, a thicker layer is preferred from the standpoint of manufacturability as it provides greater tolerance, although at some thickness, the size and weight of the overmolded material becomes an inhibiting factor. In one embodiment, the thickness of the overmolded material is greater than the 0.05 in, and, in a more particular embodiment, the thickness is at least 0.07 in. Accordingly, in such embodiments, the first and second spaces defined the optical circuit in the molds are greater than the 0.05 in, and, in a more particular embodiment, at least 0.07 in.

Figure 2:
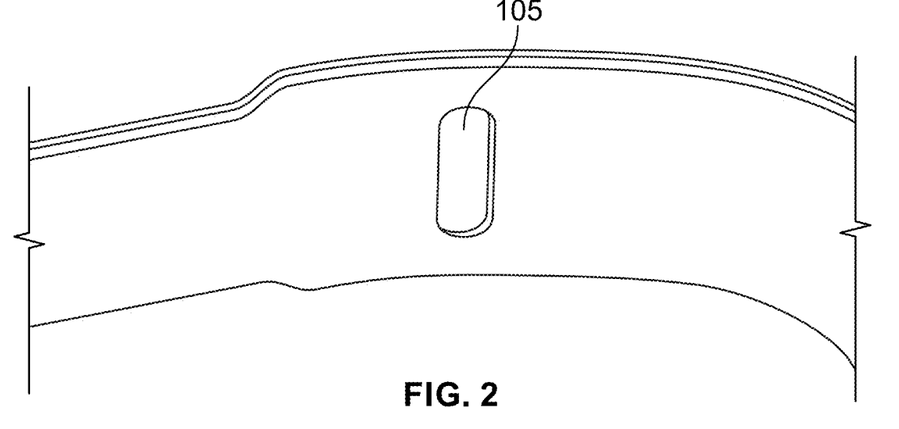
FIG. 2 shows one embodiment of a standoff on the bottom mold.

Ensuring a consistent thickness of molded of overmolding material around the circuit requires that the circuit be positioned precisely within the mold. This can be accomplished in different ways. For example, in one embodiment, standoffs are use on the bottom and/or top molds. Specifically, standoffs function essentially to hold the substrate of the optical circuit in place relative to the molds. The configuration of the standoffs may vary according to the application. For example, as shown, the standoff 105 is a simple pedestal protruding from the bottom surface of the overmolded cavity 102 upon which the substrate rests. (FIG. 2 is a close-up view of the of a section of the overmolded cavity 102 shown in FIG. 1a.)

Figure 3A:
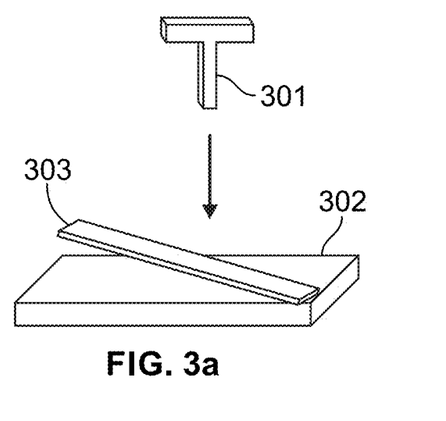
FIGS. 3a and 3b show a schematic of a standoff insert for the top mold.
Figure 3B:
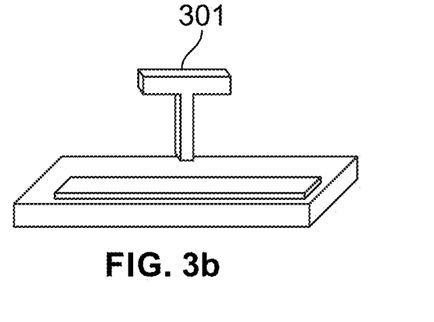
Figure 4:
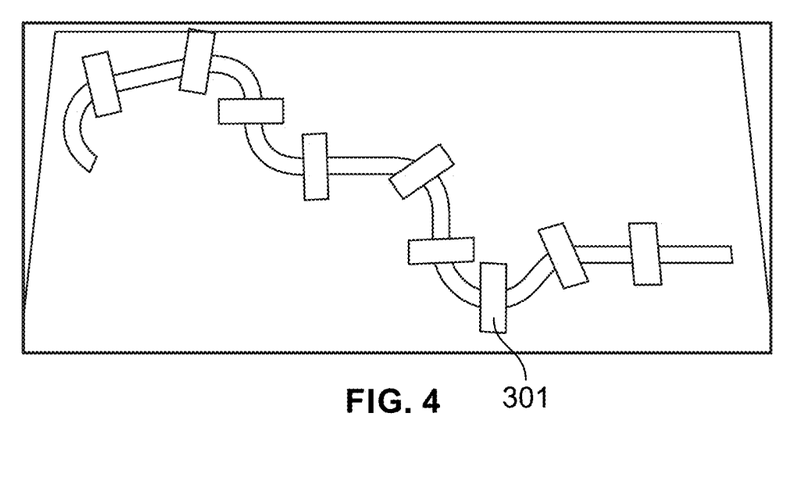
FIG. 4 shows a plurality of standoffs used on the top mold.

In one embodiment, the standoffs are also used on the top mold. The standoffs for the top mold can be similar to those in the bottom. Because the top mold has an access port 122 along the top overmolded cavity in the embodiment shown in FIG. 1d, the port 122 runs along the entire length of the top overmolded cavity. Because it is open, pedestal type standoffs are used. The "T" shape of the pedestal insures just the standoff at the bottom contacts the optical flex circuit and not the whole bottom surface of the standoff. Rather, in one embodiment, the standoffs comprise discrete T-shaped members 301 as shown in FIGS. 3a and 3b. The standoff T-shaped member 301 is used to push the optical circuit 303 down, so it lays flat on the bottom layer 302 of overmolding material as shown in FIG. 3b. The standoff T-shaped member 301, in one embodiment, is secured to the top mold as shown in FIG. 4. In this particular embodiment, the T-shaped members are adhered to the top mold using adhesive tape. It should be understood, however, that other embodiments exist, for example, the T-shaped members may be mechanically interengaged with the top surface of the top mold using latches, notches, snaps, clamps, fasteners etc.

In yet another embodiment, the standoffs comprise pins to reduce the area occupied by the standoffs. That is, in some embodiments, the standoffs are relatively thick and comprise pads for contacting the fiber circuit. The void left by such standoffs tends to be large and may require a refill process as mentioned below. However, the pin approach uses a small, e.g. 1 mm, diameter pin in the mold to support the flex circuits in the overmold.

The standoffs may be made from any material that is rigid yet can be readily released from the overmolding material. Examples of such materials include, for example, polytetrafluoroethene (PTFE) or machined metal (e.g., aluminum) coated with a release material.

Although the disclosure describes a plurality of discrete standoffs, it should be understood that other types of standoffs exist. For example, in one embodiment, rather than a plurality of discrete standoffs, a single component such as an integral insert having standoffs may be used. For example, in one embodiment, the insert may take the shape of the opening of the top plate. This insert may have standoffs (or pinch pins as described above) extending from its bottom surface. In another embodiment the standoffs are essentially permanently installed and become part of the overmolded fiber assembly. For example, in one embodiment, the standoffs comprise cured polymer of the type used for overmolding such that, after overmolding, the standoffs and the overmolding material are essentially one homogeneous material. In such an embodiment, it may be preferable to provide the standoffs with interlocking mechanical features such that when overmolded, a mechanical interlock is achieved between the standoff and the overmolded material as the adhesion between the overmolded material and a previously-cured standoff may not be as great as desired.

Still other embodiments standoff embodiments will be obvious to those of skill in the art in light of this disclosure.

Generally, the positioning of the optical circuit within the molds improves as more standoffs are used. In one embodiment, the standoffs are positioned within every 6 inches, or, in one embodiment, within every 4 inches, or, in one embodiment, within every 2 inches, or, another embodiment, within every 1 inch.

As mentioned above, in some embodiments, removing the standoffs results in voids in the overmolding material once the molds/standoffs are removed. These voids in some cases need to be filled in. Specifically, if the overmolding material is used for protection against a caustic environment, then the voids need to be filled. However, that if the overmolding material is intended to provide abrasion resistance, then the voids can often be left. That is, it is unlikely that the optical circuit can be abraded through small voids left behind by the standoffs given the surrounding overmolding material.

Nevertheless, because the voids are generally not desirable and often need to be filled in for caustic environment applications, there is a desire to minimize their use to achieve the desired positioning of the optical circuit within the molds. In other words, the standoffs on top and bottom (but especially on top) should be strategically positioned, and no more than necessary should be used to pin down the fiber to prevent it from twisting. At this time, Applicant believes the optimal locations to position the standoffs are the locations where the fiber has relatively high residual stress. Therefore, in one embodiment, residual stress is modeled in the fiber assemblies to determine where the standoffs should be positioned. In other words, a standoff should be placed where the stress exceeds a certain amount. The stress limit may be readily determined by one of skill in the art in light of this disclosure without undue experimentation.

In one embodiment, residual stress is correlated with radius of curvature such that standoffs are strategically positioned at points of high radius of curvature. For example, in one embodiment, standoffs are used in "corners" of the optical circuit where there is high radius of curvature, and also for "danger" areas, where there are multiple curves (e.g. multiple ≥90° curve) in a row. The optimum concentration of standoffs can be determined without undue experimentation.

Although standoffs are one approach for precisely positioning the optical circuit within the molds, other techniques exist. For example, in one embodiment, portions of the overmolding material may be precured before positioning the optical circuit in the mold. More specifically, Applicant has found that by allowing the overmolding material to solidify slightly, it can provide a sturdy foundation upon which the optical circuit may be placed. Although precuring is generally good for providing a sturdy foundation upon which the substrate may be placed, precuring may pose problems with the subsequent overmolding in the top mold. That is, allowing one side of the overmolded assembly to cure before applying the other may create a seam between the bottom portion the top portion of the overmolded material which may compromise the structural integrity of the overall overmolded structure. Thus, there tends to be a balance between allowing the bottom portion to precure to form a sturdy foundation and not allowing it to cure too much and create a weak seam between the top and bottom overmolded portions. For example, Applicant has found that precuring for 10 to 20 minutes, depending upon the fluoropolymer, tends to provide a suitable foundation of pre-cured polymer, yet pre-curing for greater than 30 minutes tends to create material that is too solid. Those of skill in the art will be able to optimize any precuring step.

In one embodiment, a combination of standoffs and precuring is used to control the positioning of the optical circuit within the molds.

Figure 5A:
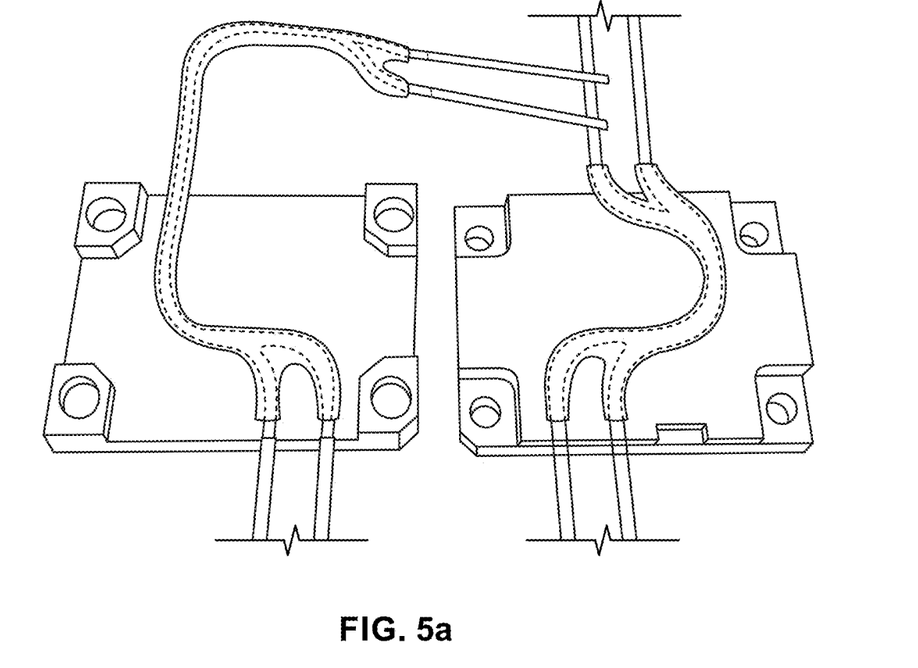
FIG. 5a shows two different, relatively simple, optical circuits.
Figure 5B:
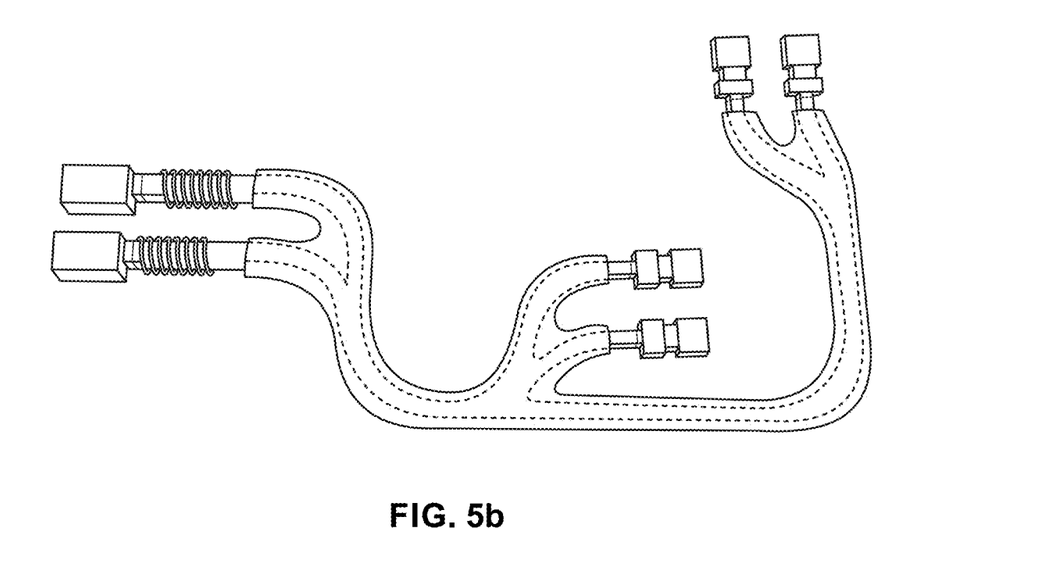
FIG. 5b shows the relatively simple optical circuits of FIG. 5a combined into a single more-complex overmolded optical circuit.

In addition to overmolding protecting the optical circuit from abrasion and caustic environments, it also can be used to combine optical circuits into assemblies. That is, relatively simple optical circuits may be combined and then overmolded to form a single, more complex cable assembly. For example, referring to FIG. 5A, two relatively simple optical circuits 501 and 502 are combined by laying one on top of the other and the overmolding them to achieve an integrated assembly 503. It should be obvious that, although just two optical circuits are used in this example, assemblies can be prepared using many optical circuits.

Figure 7:
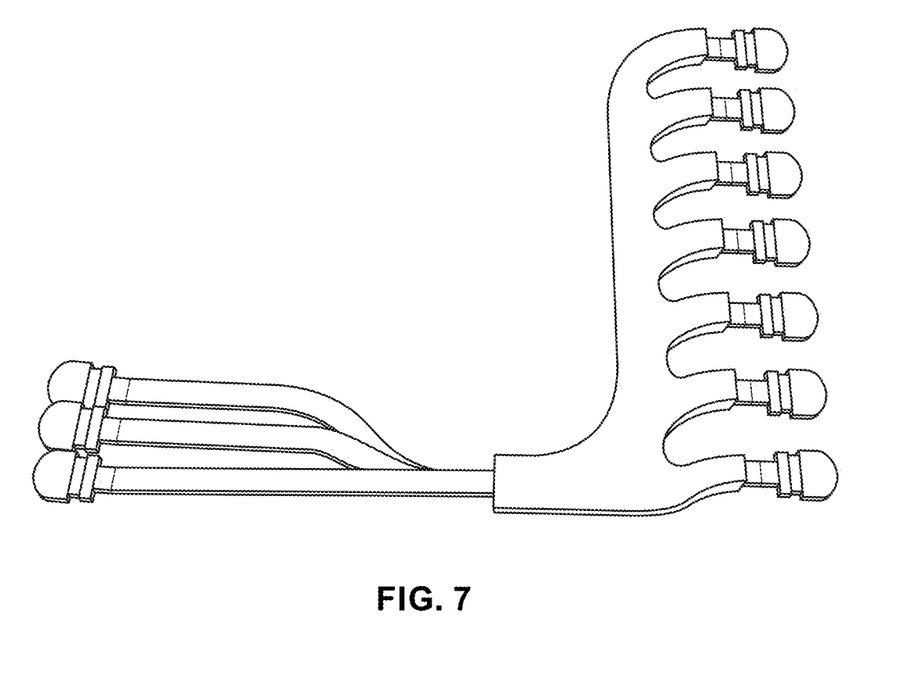
FIG. 7 shows one embodiment of a compound optical circuit with multiple legs terminated with connectors.

Likewise, overmolding may be used to increase the handling of the fiber optical fiber assemblies. For example, referring to FIG. 7, a portion 702 of the assembly 701 is overmolded to hold the various terminated ribbon cables 703 in a precise relationship to one another—e.g. all the terminated cables are held in the same plane. (If these terminated ribbon cables were supported just by the substrate of the optical circuit alone, they would be free to move in and out of the plane making connection of the terminated fibers more difficult.)

Figure 6:
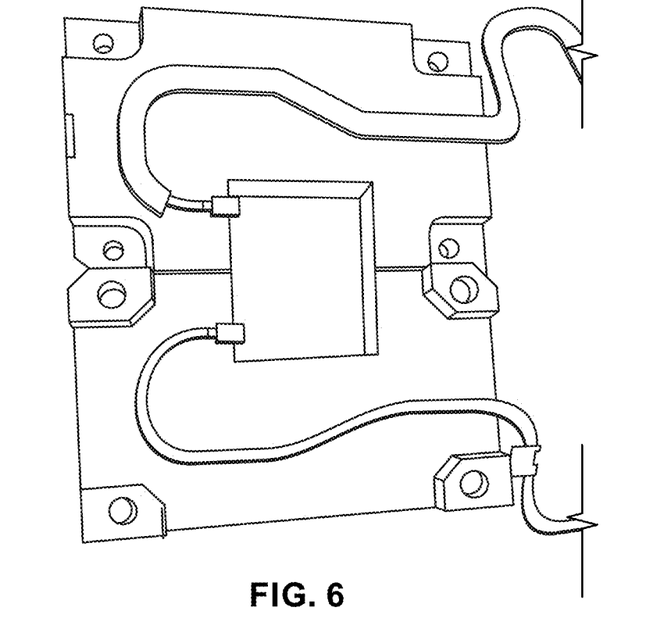
FIG. 6 shows an embodiment of a segmented molding process to over-mold long length optical circuits.

In one embodiment, the optical circuit is overmolded in segments. For example, referring to FIG. 6, an overmolded cable optical assembly is formed by overmolding portions of the assembly at different times. This allows for a smaller, more controllable mold to be used for each section. Still those of skill in the art will appreciate other alternatives in light of this disclosure.

These and other advantages may be realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

What is claimed is:

1. A method of preparing an overmolded optical fiber assembly comprising:
   (a) flowing a self-leveling fluoropolymer in a bottom mold, said bottom mold defining a bottom overmold cavity having a bottom surface, wherein flowing said self-leveling fluoropolymer in said bottom mold does not involve injection molding;
   (b) placing at least one flexible optical circuit in said bottom mold, said at least one flexible optical circuit having a substrate and a plurality of fibers adhered to said substrate, said substrate being suspended over said bottom surface to define a first space between said substrate and said bottom surface;
   (c) placing a top mold over said substrate, said top mold defining a top overmold cavity and a top surface and a port defined in said top surface to access said top overmold cavity, said substrate defining a second space between said top surface and said substrate;
   (d) flowing a self-leveling fluoropolymer through said port to fill at least a portion of said second space, wherein flowing said self-leveling fluoropolymer through said port does not involve injection molding; and (e) removing said bottom and top molds to release said overmolded optical circuit, wherein said overmolded optical circuit is flexible.

2. The method of claim 1, wherein at least said bottom mold defines fiber cavities contiguous with said bottom overmold cavity.

3. The method of claim 1, wherein said bottom mold comprises standoffs protruding from said bottom surface to maintain said first space between said substrate and said bottom surface.

4. The method of claim 1, wherein said top mold comprises standoffs for maintaining said second space.

5. The method of claim 4, wherein said standoffs are discrete from said top mold.

6. The method of claim 4, wherein said standoffs are integrated with said top mold to define said second space.

7. The method of claim 1, further comprising standoffs on at least one of said bottom mold or said top mold to define said first and second spaces, respectively, wherein said standoffs are discrete from said bottom and top molds, and are integral with said overmolded optical circuit after step (e).

8. The method of claim 1, wherein said first and said second spaces have a thickness of greater than 0.05 in.

9. The method of claim 8, wherein said first and second spaces have a thickness of at least 0.07 in.

10. The method of claim 1, wherein said fluoropolymer has a viscosity less than 80 Pa-s.

11. The method of claim 1, wherein said fluoropolymer is a fluorosilicone or a fluoroelastomer.

12. The method of claim 11, wherein said fluoropolymer is at least one of CF1-3510, SIFEL 2614, SIFEL 3405 or SIFEL 3590-N.

13. The method of claim 1, wherein step (a) is performed before step (b).

14. The method of claim 1, wherein step (a) is performed simultaneously with step (d).

15. The method of claim 1, wherein step (a) is performed before step (c).

16. The method of claim 1, wherein step (a) is performed after step (b).

17. The method of claim 13, wherein said polymer in said first space is precured before step (b).

18. An overmolded optical circuit prepared by the method of claim 1.

\* \* \* \* \*